United States Patent [19]

Fukui et al.

[11] Patent Number: 4,561,013
[45] Date of Patent: Dec. 24, 1985

[54] COLOR SIGN INSERTING CIRCUIT FOR VIDEO SIGNAL REPRODUCING SYSTEM

[75] Inventors: Tsutomu Fukui; Tomoyuki Shirai, both of Tokyo, Japan

[73] Assignee: Asahi Kogaku Kogyo Kabushiki Kaisha, Tokyo, Japan

[21] Appl. No.: 460,079

[22] Filed: Jan. 20, 1983

[30] Foreign Application Priority Data

Mar. 1, 1982 [JP] Japan ................................. 57-30649

[51] Int. Cl.⁴ .......................................... H04N 9/535
[52] U.S. Cl. ..................................... 358/22; 358/326
[58] Field of Search ................... 358/22, 19, 325, 326, 358/183, 147, 192.1; 340/703, 721, 730

[56] References Cited

U.S. PATENT DOCUMENTS 3,647,942  3/1972  Siegel ................................. 358/82

FOREIGN PATENT DOCUMENTS 2820150  11/1978  Fed. Rep. of Germany ...... 358/147

Primary Examiner—John C. Martin
Assistant Examiner—Michael P. Dunnam
Attorney, Agent, or Firm—Browdy and Neimark

[57] ABSTRACT

A color sign inserting circuit for a video signal reproducing system is disclosed, which comprises a the color burst detecting circuit for extracting color burst from a video signal detected from a recording system, a flywheel oscillator locked to the average values of the frequency and phase of a color burst signal extracted from the color burst detecting circuit for detecting time axis variation components, a phase shifter for controlling the phase of the clock output of the flywheel oscillator, and a sign inserting circuit for superimposing the output of the phase shifter and a sign signal on the video signal. Display of an inserted sign in color in the reproduction of video thus can be realized by merely adding an inexpensive color signal shifter to the conventional functions necessary for the video signal processing.

1 Claim, 1 Drawing Figure

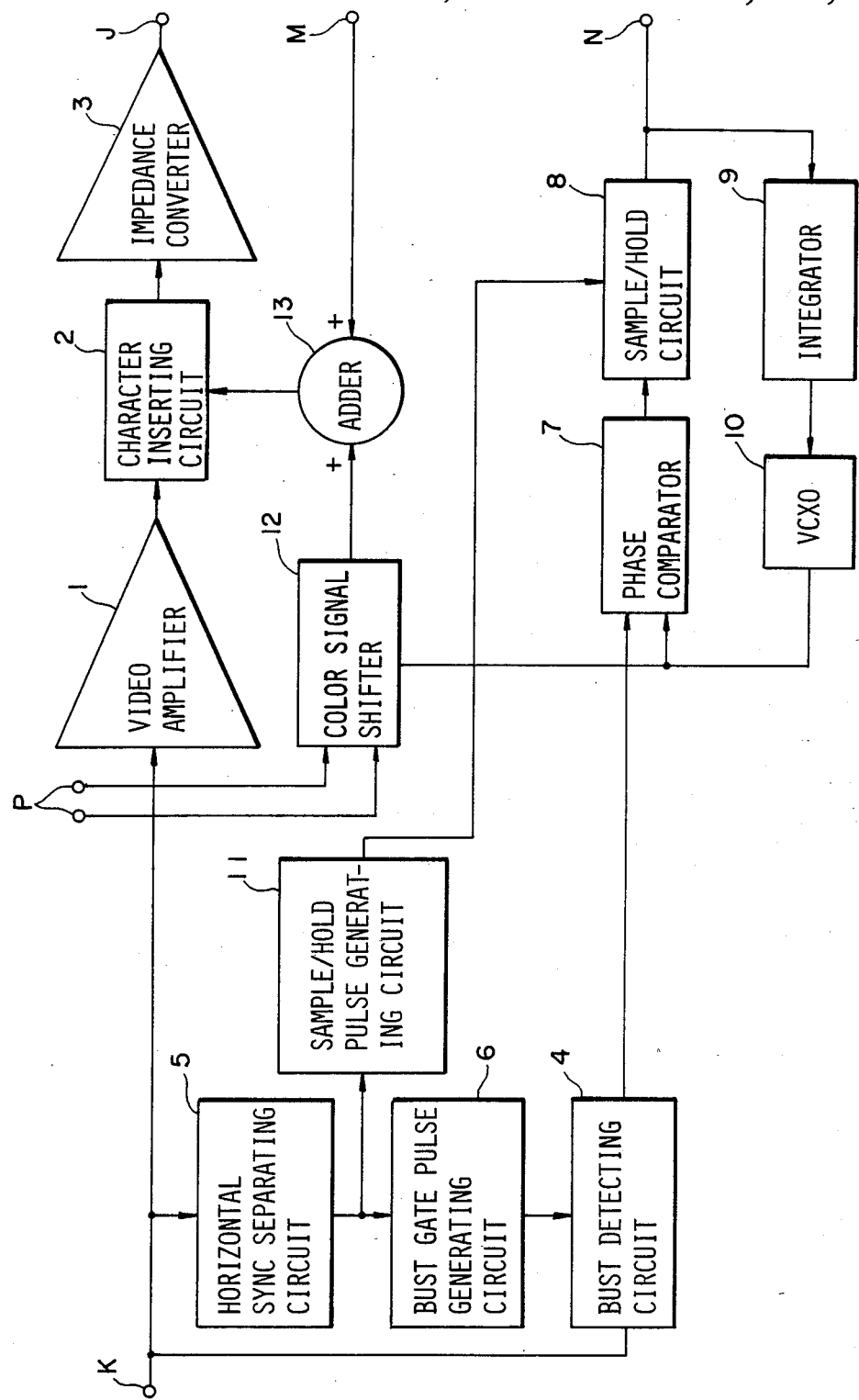

COLOR SIGN INSERTING CIRCUIT FOR VIDEO SIGNAL REPRODUCING SYSTEM

BACKGROUND OF THE INVENTION

1. Field of the Invention:

This invention relates to a color sign inserting circuit for a video signal reproducing system for inserting signs consisting of color characters or the like in the video reproduction by a video signal reproducing system such as a video disc player or a video tape recorder.

2. Description of the Prior Art:

In the prior art video signal reproducing systems, particularly in those for use in the home, signs consisting of characters or the like could be inserted only as monochrome signs as disclosed in, for instance, Japanese Laid-open Application No. 56-106477. This is so because in the prior art character sign insertion techniques a very complicated circuit is required if it is intended to obtain stable display of inserted signs in color. The complicated circuit leads to cost increase and is also liable to have adverse effects on other video signal processing circuits.

More particularly it is difficult to color-synchronize a color sign signal to the reproduced video signal with the phase precision necessary for the burst color signal. Therefore, the color hue of the inserted sign is liable to fluctuate. Secondly, the time axis of the color sign signal to be inserted in the reproduced video signal is liable to drift with fluctuations of the temperature or power supply voltage. Therefore, it is again difficult to stabilize the color hue. Thirdly, fluctuations of the characteristics of the component parts in the system and also functuations in the time axis compensation performance have adverse effects on the color hue of the display sign. To overcome this, a complicated circuit must be added, inevitably leading to cost increase.

The above difficulties have hindered the promotion of the display of inserted signs in color. Up to date, however, video signal reproducing systems are widely used, and there is strongly increasing demand for the realization of the display of inserted signs in color not only because this can elevate the commercial value of the systems, but also because this is a great factor for improving the operability of versatile systems from the standpoint of human engineering.

SUMMARY OF THE INVENTION

An object of the present invention is to provide a color sign inserting circuit for a video signal reproducing system, which can meet the demand mentioned above, is capable of a stable color sign insertion, and which can be formed by adding a simple inexpensive additional circuit.

BRIEF DESCRIPTION OF THE DRAWING

The only drawing is a block diagram showing an embodiment of the present invention.

DESCRIPTION OF THE PREFERRED EMBODIMENTS

The present invention will now be described with reference to the drawing. The drawing illustrates an embodiment of the present invention.

Referring to the drawing, a reproduced video signal, having been detected from a recording medium and demodulated in a video signal demodulating circuit (not shown), is supplied to a terminal K. The video signal appearing at the terminal K is coupled to a video amplifier 1 to be amplified to a predetermined level, which amplifier forms part of the reproducing system. The output of the video amplifier 1 is fed to a character insertion circuit as a sign insertion circuit. The character insertion circuit 2 includes a clamping circuit, which clamps the input reproduced video signal input at a predetermined level, and a mixer which mixes the clamped video signal and a character signal as a color sign signal to be inserted. The output of the character inserting circuit 2 is coupled through an impedance converter 3 to a terminal J which is connected to a usual monitor television set.

The reproduced video signal appearing at the terminal K is also coupled to a color burst detecting circuit 4 and to a horizontal sync separating circuit 5. The horizontal sync separating circuit 5 extracts the horizontal sync signal, which is fed to a color burst gate pulse generating circuit 6. The color burst gate pulse generating circuit 6 produces a burst gate pulse for operating the color burst detecting circuit 4. The color burst detecting circuit 4 extracts the color burst signal from the reproduced video signal by stopping and allowing the passage of the reproduced video signal under the control of burst gate pulses.

The color burst signal from the color burst detecting circuit 4 is fed as a reference signal for phase comparison to one input terminal of a phase comparator 7. The phase comparator 7 constitutes, together with a sample/hold circuit 8, an integrator 9 and a voltage controlled crystal oscillator (VCXO) 10, and a phase-locked loop (PLL) which serves as a flywheel oscillator for detecting time axis variation components. The frequency and phase of the oscillating output of the VCXO 10 are locked to the average values of the frequency and phase of the color burst signal inputted to the comparator 7. The phase comparator provides an error voltage as its output only during the period of the color burst signal. The output of the horizontal sync separating circuit 5 also operates a sample/hold pulse generating circuit 11, and the sample/hold circuit 8 samples and holds the error voltage output of the phase comparator 7 according to the output of the circuit 11. The sample/hold circuit 8 provides a color burst phase error signal which changes continuously according to the output of the phase comparator 7. The integrator 9 limits the frequency band of the color burst phase error signal to a superlow band, and this signal, i.e., the output of the integrator 9, serves as a control voltage for the VCXO 10. The oscillating output phase of the VCXO 10 thus varies not according to the variations of the output of the phase comparator 7 but according to the DC variations of the output of the integrator 9. The output of the sample/hold circuit 8 is fed to a terminal N. The phase comparator 7 here is used as means for detecting the color burst signal phase error. The terminal N is provided in order to effect fine time axis correction of the reproduced video signal by supplying time axis variation components not compressed by the flywheel oscillator to a variable delaying circuit consisting of, for example, a charge coupled device (CCD).

In this way, the time axis variation components based on the color burst can be sufficiently compressed by a fine time axis compensation circuit (not shown) so that the oscillating output phase of the VCXO 10 coincides with the burst signal phase of the reproduced video signal.

The output of the VCXO 10 is fed to a color signal shifter 12. The color signal shifter 12 consists of a phase control circuit such as a variable delay circuit or a voltage controlled all-pass filter based on 3.58 MHz. In the color signal shifter circuit 12, the output signal phase is controlled according to an analog or digital color hue control signal supplied from terminals P to choose the color of the sign. The oscillating output of the VCXO 10 also serves as a reference chroma signal (chrominance subcarrier) for the color display of inserted signs. The output of the color signal shifter 12, which is obtained through the color hue control of the reference chroma signal, is mixed in an adder 13 with a sign character having luminance data and supplied from a terminal M. The adder 13 has a function to switch the output from the color signal shifter 12 when the character signal is present. Such a gated adder 13 can be easily obtained by a switching circuit comprising transistors. The output of the adder 13 is superimposed upon the reproduced video signal in the character inserting circuit 2. Thus, a reproduced video signal containing the superimposed sign character signal as a color sign signal having color data is obtained from a terminal J.

The embodiment of the invention described above is by no means limiting and can be variously modified. For example, the color signal shifter 12 may be provided between the burst detecting circuit 4 and phase comparator 7 to feed the oscillating output of the VCXO 10 constituting the flywheel oscillator directly to the adder 13. Further, the output of the VCXO 10 may be supplied directly to the adder 13 instead of supplying it to the color signal shifter 12, while supplying a voltage corresponding to the color hue control signal that constitutes external disturbance to the flywheel oscillator loop to off-set the phase locked by the phase comparator 7 for color control of the sign character signal.

As has been described in the foregoing, according to the present invention the oscillating output of a flywheel oscillator for detecting time axis variation components is used as a chrominance subcarrier for giving color data to a sign signal having luminance data.

Thus, it is possible to realize a stable display of an inserted sign in color by merely adding an inexpensive simple circuit. In addition, since the flywheel oscillator synchronizes the chroma signal, it is possible to avoid adverse effects of temperature changes, changes of performance in long use or fluctuations of the characteristics of the circuit components. Further, it is possible to obtain the color control of the inserted signal to ensure stable and high quality color hue. It is thus possible to provide an inexpensive, high quality video signal reproducing system, which can sufficiently meet the demand of the versatility of video signal reproducing systems for use in home as well as for business purposes.

What is claimed is:

1. A color sign inserting circuit for video reproducing system comprising:
    a reproducing system for a reproduced video signal which is read from a recording medium and is reproduced through a video signal demodulating circuit;
    a color burst signal detecting circuit for extracting color burst signals from said reproduced video signal;
    a flywheel oscillator whose oscillating output has a frequency and phase locked to the average frequency and phase of the color burst signals extracted by said color burst signal detecting circuit and which detects time axis variation components and produces a color burst phase error signal;
    a color signal phase shifting circuit receiving said oscillating output of said flywheel oscillator as a chrominance subcarrier and further receiving a chrominance control signal to determine the color of the sign;
    an adder producing a color sign signal by adding the output of said phase shifting circuit to a sign signal which has luminance data ;and
    a sign inserting circuit provided in said reproducing system for superimposing upon said reproduced video signal said color sign signal.

* * * * *